United States Patent [19]

Schmidt

[11] 4,389,558
[45] Jun. 21, 1983

[54] METHOD FOR MAKING A BELLOWS UNIT

[75] Inventor: Jorn M. Schmidt, Nordborg, Denmark

[73] Assignee: Danfoss A/S, Nordborg, Denmark

[21] Appl. No.: 259,682

[22] Filed: May 1, 1981

[30] Foreign Application Priority Data

May 5, 1980 [DE] Fed. Rep. of Germany ....... 3017138

[51] Int. Cl.³ .............................................. B23K 11/30
[52] U.S. Cl. ................................. 219/119; 219/78.01; 228/219
[58] Field of Search ...................... 219/119, 72, 78.01, 219/78.14; 29/454; 228/219

[56] References Cited

U.S. PATENT DOCUMENTS 3,072,778  3/1961  Cook ..................................... 219/72

FOREIGN PATENT DOCUMENTS 1306689  9/1962  France .
1599244  9/1981  United Kingdom .

*Primary Examiner*—Elliot A. Goldberg
*Assistant Examiner*—Catherine Sigda

*Attorney, Agent, or Firm*—Wayne B. Easton

[57] ABSTRACT

The invention relates to apparatus and a method for assembling a thermostatic type bellows unit of the type having a cup shaped bellows housing and disposed in spaced relation thereto a corrugated cup shaped diaphragm having a rigid annular flange. The assembling involves pressure welding the diaphragm flange to the housing. The apparatus includes a bottom electrode having a chamber for receiving and supporting the bellows unit and an upper electrode having a central projection which protrudes into the diaphragm and a surrounding collar for biasing the diaphragm flange into abutting engagement with the upper edge of the housing. A suction system including a passage in the electrode projection provides a partial vacuum for drawing the diaphragm into engagement with said upper electrode projection. The chamber is then flushed with a flushing medium. A filling medium is introduced in the lower electrode chamber for filling the chamber including the space between the bellow housing and the bellows diaphragm with the filling medium. The bellows parts are then joined by pressure welding which is effected by sending a current through the electrodes.

3 Claims, 1 Drawing Figure

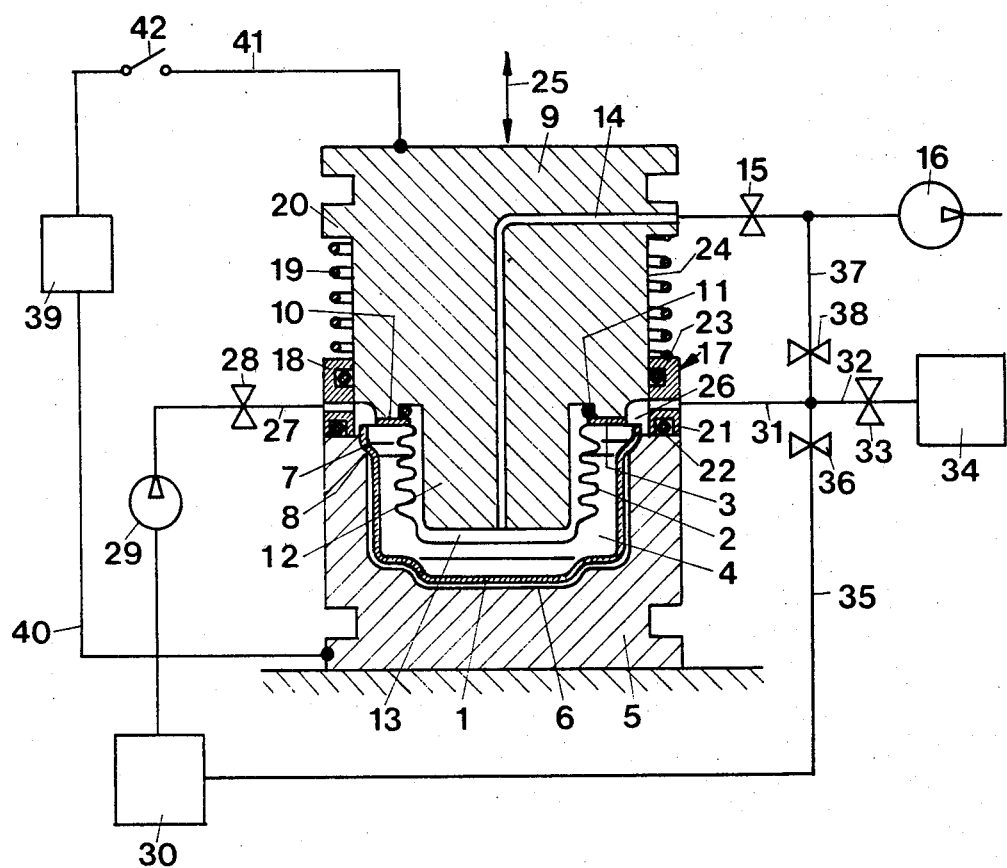

METHOD FOR MAKING A BELLOWS UNIT

The invention relates to a method for the production of a bellows element etc. without filler cap, particularly a combination sensing-and working element of a thermostatic system, where a diaphram-type wall is joined with a housing to form a hermetically sealed working chamber, and a filling medium is first introduced into the working chamber, as well as to a device for carrying out this method.

A method of this type is already known (French Pat. No. 1,306,689) where the working chamber is formed in a cup-shaped housing, which is sealed at the top by a rubber diaphragm, which is held by pressing-in or flanging an attachment. Before the working chamber is sealed, the capsule containing the filling medium is introduced, which can be destroyed by heat. This method permits to produce the bellows element without filler cap. But remnants of the capsule wall are then still in the working chamber, which can disturb the operation.

It is also known to produce a bellows element etc. (Germ. Pat. No. 2,718,609) by welding the diaphragm-type wall, which has in this case the form of a corrugated tube that is closed at one end, with an outer ring of weldable material, after which this ring is joined with an inclined surface of a cup-shaped housing by pressure welding along a circular line. To this end is used a bottom electrode with a depression for receiving the cup-shaped housing, and a top electrode which is pressed on the ring to produce the necessary pressure.

The object of the invention is to provide a method for the production of a bellows element etc. without filler cap of the above-mentioned type, where the working chamber contains no remnants.

This problem is solved according to the invention in this way that the diaphragm-type wall and the housing are joined with each other in a space filled will filling medium.

This way the atmosphere inside and outside the bellows element consists of filling medium. Consequently the working chamber contains filling medium even after it is sealed. Remnants from a capsule wall etc. do not appear. The losses caused by the filling medium remaining outside the finished bellows element are tolerable, since it presents no difficulties to keep them low, for example, by selecting a small space or by draining off the filling medium before the space is opened.

It is of advantage if the space is evacuated after the parts to be joined with each other have been introduced, and then to fill-in the filling medium. The entire space is therefore treated as otherwise the working chamber of the bellows element before the filling medium is introduced through the filler cap.

Furthermore a flushing agent can be conducted through the space before it is opened. This way the parts of the bellows element can be cleaned optionally before they are joined with each other.

In a preferred embodiment, the diaphram-type wall is joined with the housing by pressure welding along a circular line. This type of welding leads to a tight joint in such a short time that even sensitive filling media do not undergo any impairement. Another advantage of welding is that the filling medium can act in many cases as a protective gas, so that a particularly clean weld is obtained.

Furthermore the diaphragm-type wall can be joined first with the ring, and the latter welded with the housing in the space filled with the filling medium. Such a ring can be made of an easily weldable material and be stressed with a greater force than the thin wall of the respective electrode, which shortens the welding operation.

Suitable for carrying out the method is a device where a first electrode with a depression for receiving the housing and a second electrode for acting on the diaphragm-type wall can be displaced axially to each other if care is taken according to the invention that the space between the electrodes is sealed to the outside by a sealing arrangement and connected over a closable line to a filling medium source.

Since welding of the inserted parts of the bellows element is possible without handling the latter directly, the space between the electrodes can be sealed to the outside and filled with filling medium. The space between the electrodes need not be much larger than the bellows element, so that losses of filling medium can be kept low.

Both electrodes should be provided with means for retaining the respective part of the bellows element. This has the result that the two parts are held in a defined distance from each other before welding, so that a reliable penetration of the filling medium into the latter working chamber is ensured. In the simplest case, the retaining means in a bottom electrode consist of a suitable bearing surface or a depression where one part of the bellows element is retained by gravity. With an electrode arranged at the top, however, additional means are required. Here it was found particularly advantageous if the retaining means consist of a sealng ring arranged between one electrode and the respective part of the bellows element and a closable line opening in between, which can be connected to a vacuum source. The bellow element part is thus retained by suction.

With a diaphragm-type wall, which is designed as a corrugated tube protruding into a cup-shaped housing, the respective electrode can have an extension which substantially fills the corrugated tube. This way the space to be put under vacuum is kept small, so that the necessary retaining forces can be produced with a small suction pump.

In a preferred embodiment, the sealing arrangement has a ring of electrically insulating material which is pressed with an end face having a first sealing ring against an end face of the other electrode, and which carries in an inner circumferential groove a second sealing ring which bears slidingly on a circumferential groove a second sealing ring which bears slidingly on a circumferential surface of one electrode. Such a sealing arrangement combines the requirements for electrical insulation of the electrodes from each other and for sealing of the space between the electrodes to the outside.

Furthermore the space between the electrodes can be arranged in a flushing zone that can be shut off at both ends. This permits flushing prior to evacuation, and the introduction of the filling medium.

The invention will be described below more fully on the basis of a preferred embodiment represented in the drawing, which shows a section through a device according to the invention.

The bellows element to be produced consists of a cup-shaped housing 1 of steel plate, and of a diaphragm-type wall 2 which is designed here as a corrugated tube closed at one end, which carries at the free end a welded-on ring 3 of steel. In between is arranged a working chamber 4 which should be filled with a filling medium in the closed state of the bellows element, which produces a varying internal pressure particularly in dependence on the ambient temperature.

The device for the production of this bellows element has a bottom electrode 5 with a depression 6 for receiving the cup-shaped housing 1, where the cup bears with an inclined surface 7 on a corresponding supporting surface 8 of the depression. A top electrode 9 has an annular surface 10, on the inside of which is arranged a sealing ring 11 which surrounds a cylindrical projection 12 of top electrode 9. This way a sealed space 13 is formed which can be connected over a line 14 with a shutoff valve 15 to a vacuum source 16, here in the form of a suction pump. Due to the vacuum produced in space 13, the diaphragm-type wall is held firmly on top electrode 9.

A sealing arrangement 17 has a ring 18 of electrically insulating material, which is pressed down by a spring 19 bearing on a supporting surface 20 of top electrode 9. This way a sealing ring 21 provided in the bottom end face bears tightly on a top end face 22 of bottom electrode 5. Furthermore a sealing ring 23 is provided in an inner circumferential groove which cooperates sealingly with circumferential surface 24 of top electrode 9. This seal is also maintained when the top electrode moves up and down in the direction of arrow 25.

The sealing arrangement has the effect that an outwardly sealed space 26 is formed between electrodes 5 and 9. This space is connected over a line 27 traversing insulating ring 18 with a shutoff valve 28 and a feed pump 29 to a storage tank 30 for a flushing agent. Another connection over insulating ring 18 leads over a first line 32 with a shutoff valve 33 to a filling medium source 34 in which the filling medium is kept under overpressure. A second line 35 with a shutoff valve 36 leads back to the storage tank for filling medium 30. A third line 37 with a shutoff valve 38 is connected to the inlet of vacuum source 16.

A current source 39 is represented schematically, with one terminal connected over a line 40 to bottom electrode 5 and the other terminal over a line 41 with a switch 42 to top electrode 9 to supply a welding current.

In operation, the device works as follows: Electrodes 5 and 9 are moved apart. Housing 1 is placed together with the loosely inserted diaphragm type wall 2 into depression 6. Top electrode 9 is moved down until annular surface 10 bears on ring 3. Then shutoff valve 15 is opened briefly so that a vacuum is produced in space 13. Then electrode 9 is raised with wall 2 secured thereon into the illustrated position. By opening shutoff valves 28 and 36, space 26 between the electrodes is traversed by the flushing agent. All impurities are therefore removed. After this operation, shutoff valve 33 is briefly opened so that space 26 including working chamber 4 is filled with filling medium. Top electrode 9 is now pressed down and, by closing switch 42, the welding current is briefly turned on. This results in pressure welding between the bottom outer edge of ring 3 and the upper edge of housing 1. This welding operation is completed after a very short time without the filling medium in working chamber 4 being impaired. Then the electrodes are moved apart and the finished bellows element is removed.

If the small amount of filling medium remaining in space 26 outside the bellows element is to be lost, it can be drained off through a corresponding suction device and fed again to filling medium source 34. Particularly suitable for welding the parts of the bellows element are the measures described in German Pat. No. 2,718,609. The entire method can be automated, so that the individual operations are performed step by step on a production line. This permits a very reliable mass production. The invention also protects bellows elements produced according to the above-described method, which are characterized in that they have neither a filler cap nor contain any residues in the space filled with filling medium. They have a weld produced in a filling medium atmosphere.

What is claimed is:

1. A method for assembling a bellows unit of the type having a cup shaped housing and disposed in spaced and nested relation thereto a corrugated cup shaped diaphragm having a rigid annular flange, said assembling involving pressure welding said flange to said housing, said method comprising the steps of providing a bottom electrode having a cavity for receiving and supporting a housing, providing an upper electrode having a central projection which protrudes into said diaphragm and a surrounding collar for biasing said diaphragm flange into abutting engagement with the upper edge of said housing, providing suction means including passage means in said electrode projection to provide a partial vacuum for drawing said diaphragm into engagement with said upper electrode projection, providing sealing means between said upper and lower electrodes, providing filling medium passage means in said apparatus extending from said cavity to a point externally thereof, filling said cavity including the space between said housing and said diaphragm with a filling medium via said filling medium passage means, and joining said housing and said diaphragm to form a bellows unit with a portion of said filling medium being sealed internally therein.

2. A method according to claim 1 including the providing of flushing medium passage means in said apparatus extending from said cavity to a point externally thereof to allow flushing of said cavity to remove impurities therefrom prior to introducing a filling medium to said cavity.

3. A method according to claim 1 wherein said joining of said housing and said diaphragm is performed by pressure welding along a circular line.

* * * * *